United States Patent [19]

Bui et al.

[11] Patent Number: 5,389,958
[45] Date of Patent: Feb. 14, 1995

[54] IMAGING PROCESS

[75] Inventors: Loc V. Bui, Portland; Donald R. Titterington, Tualatin; James D. Rise, Lake Oswego; C. Wayne Jaeger, Beaverton; Jon C. Mutton, Portland; Hue P. Le, Beaverton, all of Oreg.

[73] Assignee: Tektronix, Inc., Wilsonville, Oreg.

[21] Appl. No.: 981,646

[22] Filed: Nov. 25, 1992

[51] Int. Cl.6 ............................................ B41J 2/05
[52] U.S. Cl. .................................................. 347/103
[58] Field of Search .................. 346/1.1, 21, 25, 75, 346/140; 355/211, 271, 273, 256; 347/103, 88, 99

[56] References Cited

U.S. PATENT DOCUMENTS

| | | | |
|---|---|---|---|
| 2,340,562 | 1/1944 | Rex | 346/21 X |
| 3,653,932 | 4/1972 | Berry et al. | 106/22 |
| 3,715,219 | 2/1973 | Kurz | 106/22 |
| 3,898,670 | 8/1975 | Erikson | 346/21 |
| 4,140,907 | 2/1979 | Oba . | |
| 4,293,866 | 10/1981 | Takita et al. | 346/140 |
| 4,368,669 | 1/1983 | Love | 101/426 |
| 4,390,369 | 6/1983 | Merritt et al. | 106/31 |
| 4,484,948 | 11/1984 | Merritt et al. | 106/31 |
| 4,521,785 | 6/1985 | Matsufuji | 346/25 |
| 4,538,156 | 8/1985 | Durkee et al. | 346/21 |
| 4,659,383 | 4/1987 | Lin et al. | 106/27 |
| 4,673,303 | 6/1987 | Sansone et al. | 400/126 |
| 4,684,956 | 8/1987 | Ball | 346/1.1 |
| 4,731,647 | 3/1988 | Kobashi | 358/75 |
| 4,830,671 | 5/1989 | Frihart et al. | 106/27 |
| 4,833,486 | 5/1989 | Zerillo | 346/1.1 |
| 4,833,530 | 5/1989 | Kohashi | 358/75 |
| 4,889,560 | 12/1989 | Jaeger et al. | 106/27 |
| 4,889,761 | 12/1989 | Titterington et al. | 428/195 |
| 4,992,304 | 2/1991 | Titterington | 427/164 |
| 5,084,099 | 1/1992 | Jaeger et al. | 106/22 |
| 5,099,256 | 3/1992 | Anderson | 346/1.1 |

FOREIGN PATENT DOCUMENTS

| | | | |
|---|---|---|---|
| 7000 | 4/1993 | European Pat. Off. | B41J 2/005 |
| 146750 | 6/1989 | Japan | B41J 3/04 |
| 4251747 | 9/1992 | Japan | B41J 2/015 |
| 9401283 | 1/1994 | Japan | B41J 2/01 |

OTHER PUBLICATIONS

"Analysis of Polymer Ink Transfer Phenomenon in Thermal Transfer Printing Technology" by Akutsu et al. from IS&T's 8th International Congress on Advances in Non-Impact Printing Technologies (1992).

"Hot Melt Inks for Colored Ink Jet Images" by Creagh et al. International Publication No. WO 91/10711 (Jul. 25, 1991).

*Primary Examiner*—Joseph W. Hartary
*Attorney, Agent, or Firm*—Ralph D'Alessandro

[57] ABSTRACT

A method and the apparatus for employing the method are disclosed whereby an intermediate transfer surface of a layer of sacrificial liquid is applied to a supporting surface and a phase change ink is deposited on the liquid layer. The inked image is then contact transferred to a final receiving substrate.

31 Claims, 1 Drawing Sheet

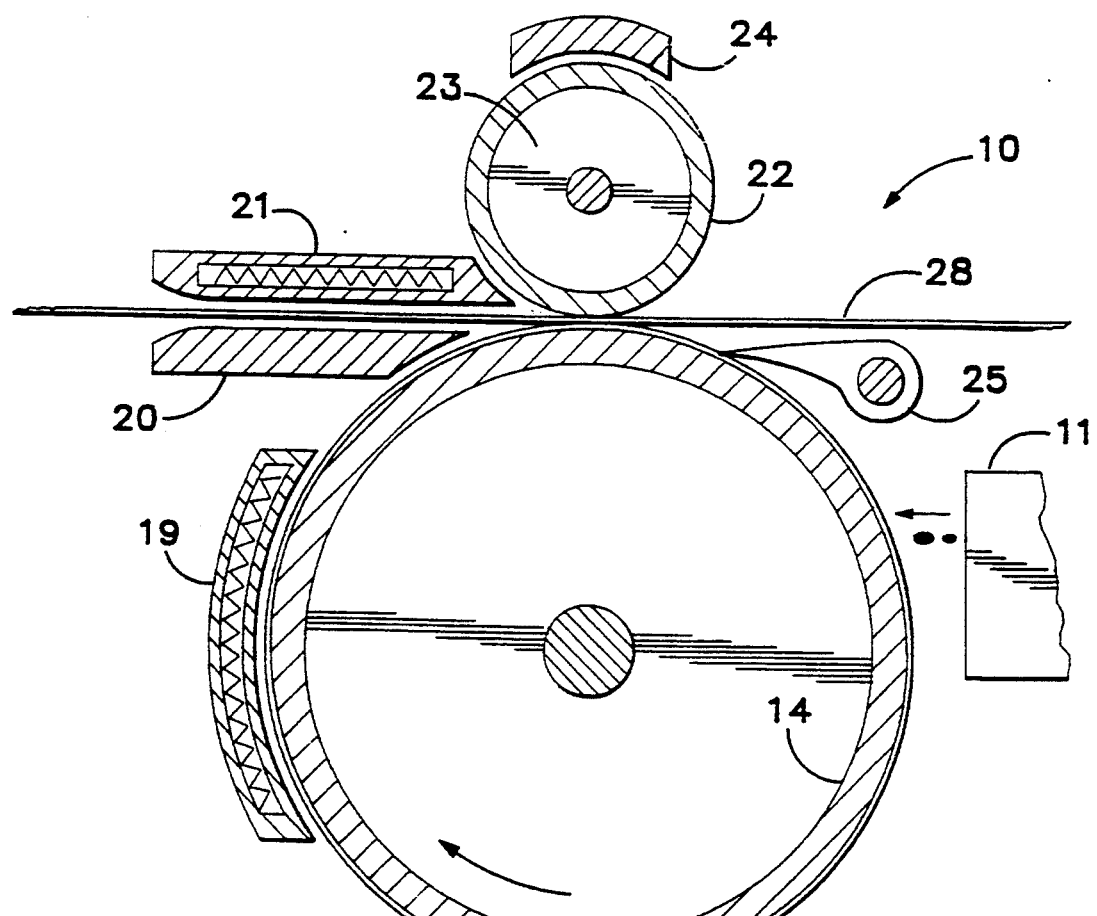
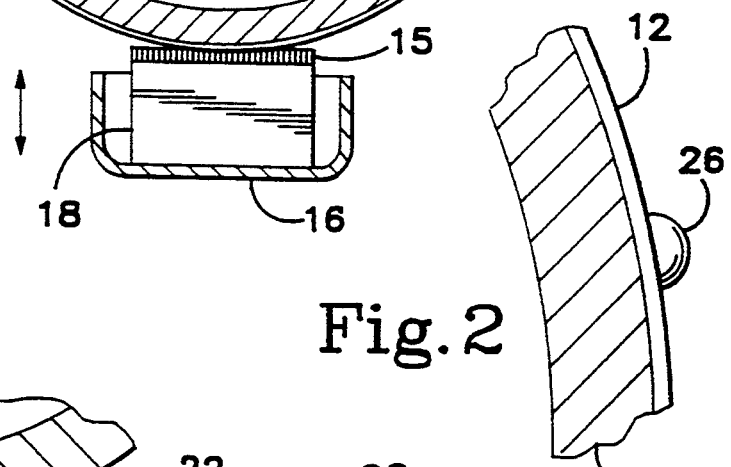
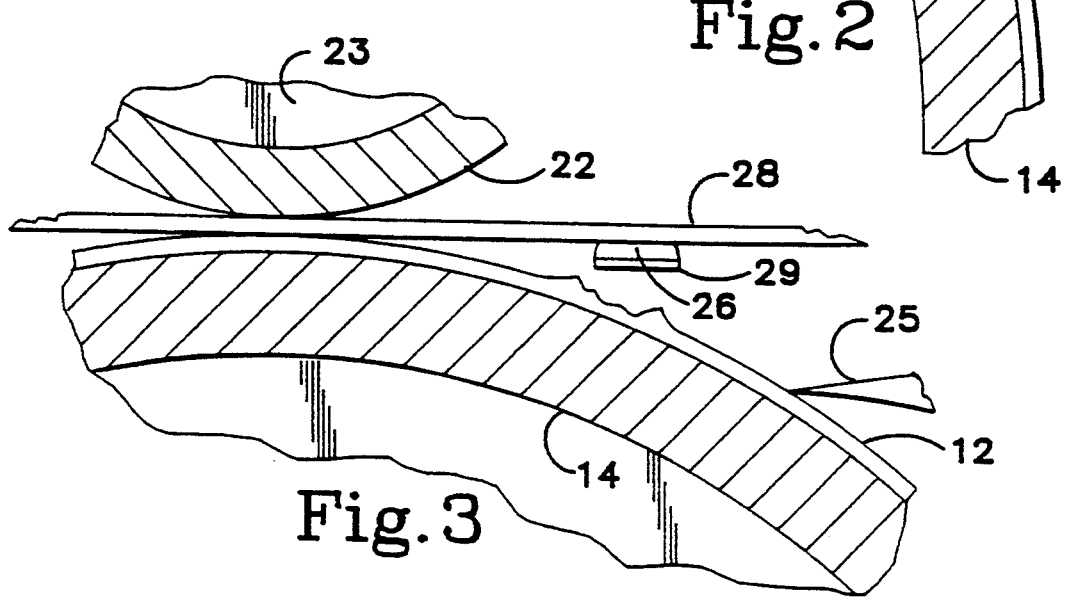
Fig.1
Fig.2
Fig.3

IMAGING PROCESS

FIELD OF THE INVENTION

This invention relates generally to an imaging process. More specifically, this invention relates to a ink jet printing system and process utilizing an intermediate transfer surface.

BACKGROUND OF THE INVENTION

Ink jet printing systems have been employed utilizing intermediate transfer surfaces, such as that disclosed in U.S. Pat. No. 4,538,156 to Durkee et al. This patent discloses a system wherein an intermediate transfer drum is employed with a printhead. A final receiving surface of paper is brought into contact with the intermediate transfer drum after the image has been placed thereon by the nozzles in the printhead. The image is then transferred to the final receiving surface.

U.S. Pat. No. 5,099,256 to Anderson describes an intermediate drum with a surface which receives ink droplets from a printhead. The intermediate drum surface is thermally conductive and formed from a suitable film-forming silicone polymer allegedly having a high surface energy and high degree of surface roughness to prevent movement of the ink droplets after receipt from the printhead nozzles. Other imaging patents, such as U.S. Pat. Nos. 4,731,647 and 4,833,530 to Kohsahi, disclose a solvent which is deposited on colorant to dissolve the colorant and form a transferable drop to a recording medium. The colorants are deposited directly onto paper or plastic colorant transfer sheets. The transferable drops are then contact transferred to the final receiving surface medium, such as paper.

U.S. Pat. No. 4,673,303 to Sansone et al. discloses an offset ink jet postage printing method and apparatus in which an inking roll applies ink to the first region of a dye plate. A lubricating hydrophilic oil can be applied to the exterior surface of the printing drum or roll to facilitate the accurate transfer of the images from the drum or roll to the receiving surface.

All of these processes do not achieve a complete image transfer from the intermediate transfer surface and, therefore, require a separate cleaning step to remove any residual ink from the intermediate receiving surface. The inclusion of cleaning apparatus is both costly and time consuming in color printing equipment. Prior intermediate transfer surfaces also have not been renewable.

Also, all of these prior processes are limited in the degree of image quality which can be achieved on different types of final receiving surfaces or print media. Since the inks are fluids, they are subject to uncontrolled bleeding on porous media, such as paper, and uncontrolled spreading on transparency films or glossy coated papers.

These problems are solved in the process and apparatus of the present invention by providing an apparatus and process which supplies a liquid layer as the intermediate transfer surface on a supporting surface for the transferred image. The image is then transferred with at least a portion of the liquid layer from the liquid layer to a final receiving medium. The image is preferably formed from a phase change ink. The apparatus and process produce uniformly high quality images on a wide range of media through the use of phase change ink that is transferred to the final receiving substrate or medium in a malleable solid state.

SUMMARY OF THE INVENTION

It is an object of the present invention to provide an improved imaging method and apparatus which allows high quality imaging on a variety of media and obviates the need for separate cleaning apparatus and a separate cleaning step.

It is another object of the present invention to provide an improved imaging apparatus and method for imaging that utilizes a liquid layer on a supporting surface which receives the image to be transferred prior to transferring the image to a final receiving medium, which may be a transparency, paper or other suitable media.

It is a feature of the present invention that the liquid layer is a sacrificial layer on the supporting surface which can at least partially be transferred with the transferred image to the final receiving medium.

It is another feature of the present invention that the liquid layer acts as a release agent on the supporting surface.

It is still another feature of the present invention that the supporting surface is a rotatable drum.

It is yet another feature of the present invention that the liquid layer can be selected from the group consisting of water, fluorinated oil, glycol, surfactant, mineral oil, silicone oil, functional oil and combinations thereof.

It is yet a further feature of the present invention that a simple path for the paper or final receiving medium through the imaging apparatus is obtained by the present invention to thereby minimize both the expense and the mechanical parts for paper or final medium handling and the amount of time needed for the apparatus to handle the final receiving medium.

It is another advantage of the present invention that the liquid layer is replenishable on the supporting surface for subsequent images and can at least partially be transferred with the image to the image receiving medium.

It is still a further advantage of the present invention that the liquid layer which serves as the intermediate transfer layer is sufficiently thick enough that a multiplicity of images can be transferred before it is necessary to replenish the liquid layer that is present on the supporting surface.

It is yet another advantage of the present invention that the supporting surface need not be cleaned prior to re-imaging with a different color or the same color.

It is yet a further advantage of the present invention that high quality images can be produced on a variety of final receiving surfaces or media.

These and other objects, features and advantages are obtained by the apparatus and the method of utilizing that apparatus by applying a liquid layer to a supporting surface such that the liquid layer has at least a first surface not in contact with the supporting surface which receives the image to be transferred thereon and the transferring of that image to a final receiving medium.

BRIEF DESCRIPTION OF THE DRAWINGS

The objects, features and advantages of the invention will become apparent upon consideration of the following detailed disclosure of the invention, especially when it is taken in conjunction with the accompanying drawings wherein:

FIG. 1 is a diagrammatic illustration of the apparatus having a supporting surface adjacent a liquid layer applicator and a print head which applies the image to be transferred to the liquid layer;

FIG. 2 is an enlarged diagrammatic illustration of the liquid layer acting as an intermediate transfer surface supporting the ink; and FIG. 3 is an enlarged diagrammatic illustration of the transfer of the inked image from the liquid intermediate transfer surface to a final receiving surface.

DETAILED DESCRIPTION OF THE PREFERRED EMBODIMENT

FIG. 1 discloses a diagrammatical illustration of the imaging apparatus 10 utilized in the instant process to transfer an inked image from an intermediate transfer surface to a final receiving substrate. A printhead 11 is supported by an appropriate housing and support elements (not shown) for either stationary or moving utilization to place an ink in the liquid or molten state on the supporting intermediate transfer surface 12 of FIGS. 2 and 3 that is applied to the surface of the supporting surface 14. Intermediate transfer surface 12 is a liquid layer that is applied to the supporting surface 14, which is shown as a drum, but may also be a web, platen, or any other suitable design, by contact with an applicator, such as a metering blade, roller, web or the shown wicking pad 15 contained within applicator assembly 16. The supporting surface 14 may be formed from any appropriate material, such as metals including but not limited to aluminum, nickel or iron phosphate, elastomers including but not limited to fluoroelastomers, perfluoroelastomers, silicone rubber and polybutadiene, plastics including but not limited to polytetrafluorethylene loaded with polyphenylene sulfide, thermoplastics such as polyethylene, nylon, and FEP, thermosets such as acetals, or ceramics could be employed as long as the exposed surface is sufficiently rigid to deform the transferred image-forming ink 26 when the final receiving medium passes between it and the transfer and fixing roller 22 and sufficiently smooth so as not to interfere with the ability of the intermediate transfer surface or liquid layer to support the image-forming ink 26 of FIG. 2. The preferred material is anodized aluminum.

Applicator assembly 16 optionally contains a reservoir and wicking pad 15 for the liquid and most preferably contains a web and web advancing mechanism (both not shown) to periodically present fresh web for contact with the drum 14. Wicking pad 15 or the web is preferably any appropriate nonwoven synthetic textile with a relatively smooth surface. The web can be polyester. A preferred configuration can employ the smooth wicking pad 15 mounted atop a porous supporting material 18, such as a polyester felt. Both materials are available from BMP Corporation as BMP products NR 90 and PE 1100-UL, respectively. Applicator apparatus 16 is mounted for retractable movement upward into contact with the surface of drum 14 and downwardly out of contact with the surface of the drum 14 and its liquid layer 12 by means of appropriate mechanism, such as an air cylinder or an electrically actuated solenoid.

FIG. 1 shows a final substrate guide 20 that passes the final receiving substrate 28, such as paper, from a positive feed device (not shown) and guides it through the nip formed by the opposing arcuate surfaces of the roller 22 and the intermediate transfer surface 12 supported by the drum 14. Stripper fingers 25 (only one of which is shown) may be pivotally mounted to the imaging apparatus 10 to assist in removing any paper or other final receiving substrate media from the exposed surface of the liquid layer forming the intermediate transfer surface 12. Roller 22 has a metallic core, preferably steel, with an elastomeric covering that has a 40 to 45 Shore D rating. Suitable elastomeric covering materials include silicones, urethanes, nitriles, EPDM and other appropriately resilient materials. The elastomeric covering on roller 22 engages the final receiving substrate 28 on the reverse side to which the ink image 26 is transferred from the exposed surface of the liquid layer forming the intermediate transfer surface 12. This fuses or fixes the ink image 26 to the surface of the final receiving surface so that the ink image is spread, flattened and adhered.

The ink utilized in the process and system of the instant invention is preferably initially in solid form and is then changed to a molten state by the application of heat energy to raise the temperature to about 85° C. to about 150° C. Elevated temperatures above this range will cause degradation or chemical breakdown of the ink. The molten ink is then applied in raster fashion from the ink jets in the printhead 11 to the exposed surface of the liquid layer forming the intermediate transfer surface 12, where it is cooled to an intermediate temperature and solidifies to a malleable state in which it is transferred to the final receiving surface 28 via a contact transfer by entering the nip between the roller 22 and the liquid layer forming the intermediate transfer surface 12 on the support surface or drum 14. This intermediate temperature where the ink is maintained in its malleable state is between about 30° C. to about 80° C.

Once the solid malleable ink image enters the nip, it is deformed to its final image Conformation and adheres or is fixed to the final receiving substrate either by the pressure exerted against ink image 26 on the final receiving substrate 28 by the roller 22 alone, or by the combination of the pressure and heat supplied by heater 21 and/or heater 19. Heater 24 could optionally be employed to supply heat to facilitate the process at this point. The pressure exerted on the ink image 26 is between about 10 to about 2000 pounds per square inch (psi), more preferably between about 500 to about 1000 psi, and most preferably between about 750 to about 850 psi. The pressure must be sufficient to have the ink image 26 adhere to the final receiving substrate 28 and be sufficiently deformed to ensure that light is transmitted through the ink image rectilinearly or without significant deviation in its path from the inlet to the outlet, in those instances when the final receiving substrate is a transparency. Once adhered to the final receiving substrate 28, the ink image is cooled to ambient temperature of about 20-25 degrees Centigrade. The ink comprising the ink image must be ductile, or be able to yield or experience plastic deformation without fracture when kept at a temperature above the glass transition temperature. Below the glass transition temperature the ink is brittle. The temperature of the ink image in the ductile state is between about −10° C. and to about the melting point or less than about 85° C.

FIG. 3 diagrammatically illustrates the sequence involved when an ink image 26 is transferred from the liquid layer forming the intermediate transfer surface 12 to the final receiving substrate 28. As seen in FIG. 3, the ink image 26 transfers to the final receiving substrate 28 with a small, but measurable quantity of the liquid in the intermediate transfer surface 12 attached thereto as an outer layer 29. The average thickness of the transferred liquid layer 29 is calculated to be about 0.8 nanometers. Alternatively, the quantity of transferred liquid layer 29 can be expressed in terms of mass as being from about 0.1 to about 200 milligrams, and more preferably from about 0.5 to about 50 milligrams, and most preferably from about 1 to about 10 milligrams per page of final receiving substrate 28. This is determined by tracking on a test fixture the weight loss of the liquid in the applicator assembly 16 at the start of the imaging process and after a desired number of sheets of final receiving substrate 28 have been imaged.

Some appropriately small and finite quantity of the liquid in the liquid layer forming the intermediate transfer surface 12 also is transferred to the final receiving substrate in areas adjacent the transferred ink image 26. This relatively small transfer of the liquid from the intermediate transfer surface 12 with the ink image 26 and to the non-imaged areas on the final receiving substrate 28 can permit as many as ten pages or more of the final receiving substrate 28 to be imaged before it is necessary to replenish the sacrificial liquid layer forming the intermediate transfer surface 12. Replenishment may be necessary after fewer final imaged copies, depending on the quality and nature of the final receiving surface 28 that is utilized. Transparencies and paper are the primary intended media for image receipt. Commonly called "plain paper" is the preferred medium, such as that supplied by Xerox Corporation and many other companies for use in photocopy machines and laser printers. Many other commonly available office papers are included in this category of plain papers, including typewriter grade paper, standard bond papers, and letterhead paper. Xerox 4024 paper is assumed to be a representative grade of plain paper for the purposes of this invention.

While the thickness of the liquid layer forming the intermediate transfer surface 12 on the supporting surface or drum 14 can be measured, such as by the use of reflectance Fourier Transform infrared spectroscopy or a laser interferometer, it is theorized that the thickness can vary from about 0.05 microns to about 60 microns, more preferably from about 0.1 to about 50, and most preferably from about 1 to about 10 microns. The thickness of the layer forming the intermediate transfer surface 12 can increase if rougher surfaced supporting surfaces or drums 14 are employed. The surface topography of the supporting surface or drum 14 can have a roughness average ($R_a$) of from about 254 Angstroms to about 25,400 Angstroms (about 1 microinch to about 100 microinches), and a more preferred range of from about 5 to about 15 microinches. The image quality will degrade when a liquid layer thicker than about 60 microns is used to form the intermediate transfer surface 12.

Suitable liquids that may be employed as the intermediate transfer surface 12 include water, fluorinated oils, glycol, surfactants, mineral oil, silicone oil, functional oils or combinations thereof. Functional oils can include, but are not limited to, mercapto-silicone oils, fluorinated silicone oils and the like.

The liquid layer 12 that forms the intermediate transfer surface on the surface of drum 14 is heated by an appropriate heater device 19. Heater device 19 may be a radiant resistance heater positioned as shown or, more preferably, positioned internally within the drum 14. Heater devices 21 and 24 can also be employed in the paper, or final receiving substrate guide apparatus 20 and in the fusing and fixing roller 22, respectively. Heater device 19 increases the temperature of the liquid intermediate transfer surface from ambient temperature to between about 25° C. to about 70° C. or higher. This temperature is dependent upon the exact nature of the liquid employed in liquid layer or intermediate transfer surface 12 and the ink employed. A more preferred range is between about 30° C. to about 60° C., and a most preferred range is from about 45° C. to about 52° C.

Heater 21 preheats the final receiving medium prior to the fixation of the ink image by being set to heat between about 70° C. to about 200° C., more preferably to between about 85° C. and about 140° C., and most preferably to between about 110° C. to about 130° C. It is theorized that heater 21 raises the temperature of the final receiving medium to between about 90° C. and about 100° C. However, the thermal energy of the receiving media is kept sufficiently low so as not to melt the ink upon transfer to the final receiving substrate 28. Heater 24, when employed, heats the transfer and fixing roller 22 to a temperature of between about 25° C. and about 200° C. and alternatively may also be employed internally within roller 22.

The ink used to form the ink image 26 preferably must have suitable specific properties for viscosity. Initially, the viscosity of the molten ink must be matched to the requirements of the ink jet device utilized to apply it to the intermediate transfer surface 12 and optimized relative to other physical and rheological properties of the ink as a solid, such as yield strength, hardness, elastic modulus, loss modulus, ratio of the loss modulus to the elastic modulus, and ductility. The viscosity of the phase change ink carrier composition has been measured on a Ferranti-Shirley Cone Plate Viscometer with a large cone. At about 140° C. a preferred viscosity of the phase change ink carrier composition is from about 5 to about 30 centipoise, more preferably from about 10 to about 20 centipoise, and most preferably from about 11 to about 15 centipoise. The surface tension of suitable inks is between about 23 and about 50 dynes/centimeter. An appropriate ink composition is that described in U.S. Pat. No. 4,889,560 issued Dec. 26, 1989 and assigned to the assignee of the present invention.

Such an ink has a composition comprising a fatty amide-containing material employed as a phase change ink carrier composition and a compatible colorant. The fatty amide-containing material comprises a tetraamide compound and a monoamide compound. The phase change ink carrier composition is in a solid phase at ambient temperature and in a liquid phase at elevated operating temperature. The phase change ink carrier composition can comprise from about 10 to about 50 weight percent of a tetraamine compound, from about 30 to about 80 weight percent of a secondary monoamide compound, from about 0 to about 40 weight percent of a tackifier, from about 0 to about 25 weight percent of a plasticizer, and from about 0 to about 10 weight percent of a viscosity modifying agent.

The subject phase change ink used in the instant invention is formed from a phase change ink carrier composition which exhibits excellent physical properties. For example, the subject phase change ink, unlike prior art phase change inks, exhibits a high level of lightness, chroma, and transparency when utilized in a thin film of substantially uniform thickness. This is especially valuable when color images are conveyed using overhead projection techniques. Furthermore, the preferred phase change ink compositions exhibit the preferred mechanical and fluidic properties mentioned above when measured by dynamic mechanical analyses (DMA), compressive yield testing and viscometry. More importantly, these work well when used in the printing process of the instant invention utilizing a liquid layer as the intermediate transfer surface. The phase change ink composition and its physical properties are discussed in greater detail in copending application U.S. Ser. No. 07/981,677, filed Nov. 25, 1992 and assigned to the assignee of the present invention.

The transmission spectra for each of the phase change inks used in the process of this invention were evaluated on a commercially available spectrophotometer, the ACS Spectro-Sensor II, in accordance with the measuring methods stipulated in ASTM 1E805 (Standard Practice of Instrumental Methods of Color or Color Difference Measurements of Materials) using the appropriate calibration standards supplied by the instrument manufacturer. For purposes of verifying and quantifying the overall colorimetric performance of the inks used in the process and as a part of this invention, measurement data were reduced, via tristimulus integration, following ASTM E308 (Standard Method for Computing the Colors of Objects using the CIE System) in order to calculate the 1976 CIE L*, (Lightness), a* (redness-greenness), and b* (yellowness-blueness), (CIELAB) values for each phase change ink sample. In addition, the values for $Q_{hab}$ELAB Psychometric Chroma, $C^*_{ab}$, and CIELAB Psychometric Hue Angle, were calculated according to publication CIE15.2, Colorimetry (Second Edition, Central Bureau de la CIE, Vienna, 1986).

Unlike conventional phase change ink carriers, the nature of the phase change ink carrier composition of the inks used in the process of the present invention is such that thin films of substantially uniform thickness exhibit a relatively high L* value. For example, a substantially uniform thin film of about 20 micron thickness of the phase change ink carrier composition of this invention preferably has an L* value of at least about 65, more preferably at least about 75, and most preferably at least about 85.

The phase change inks used herein have a relatively high C*ab value when measured as a thin film of substantially uniform thickness. Previously, conventional phase change inks have had a very low degree of rectilinear light transmissivity, even in thin films of substantially uniform thickness. The phase change ink composition used in the process of this invention has C*ab values, when applied as a substantially uniform thin film of about 10 micron thickness with subtractive primary yellow, magenta and cyan color phase change ink compositions, that preferably are at least about 40 for said yellow ink composition, at least about 65 for said magenta ink composition, and at least about 30 for the cyan ink composition.

It is also important that the black color phase change ink component be at a minimum light transmissivity level so that the color intensity of the ink is maximized. Accordingly, the L* value of a substantially uniform thin film of about 10 microns thickness of a black color phase change ink is preferably not more than about 35, more preferably not more than about 30, and most preferably not more than about 25.

The respective phase change ink and ink carrier compositions, when transferred to the final substrate in a thin film, are quite durable. One indication of durability is abrasion resistance. For purposes of this invention, abrasion resistance is determined by testing a finished print sample of the phase change ink produced from the carrier composition in a Teledyne Taber Abrader, Model 5130, utilizing CS-230 Abrasion wheels loaded with 500 gram weights. The abrasion wheels are resurfaced after each sample with an S-11 resurfacing disk. Samples printed on paper were tested according to ASTM D406(F84 (Standard Test Method For Abrasion Resistance of Organic Coatings by the Taber Abrader). Samples printed on light transmissive thin films were tested using ASTM D1304Q-85 (Standard Test Method For Resistance of Transparent Plastics to Surface Abrasion). Print samples were tested as described above, and the results of those tests demonstrated excellent abrasion resistance.

A further test employed to evaluate the durability of phase change inks and ink carrier compositions is an offset transfer or blocking test. This determines whether the phase change ink printed on a substrate will adhere to an adjacent substrate at ambient or elevated temperatures when the printed products are stacked one on top of the other. The blocking test is conducted using an indirect transfer method by printing samples of the phase change ink produced from the carrier composition onto a paper or thin film substrate and placing that substrate in a manila folder under a one pound piece of aluminum, about 8.5 inches wide and about 11 inches long to evenly distribute the weight of a 10 pound block. These printed samples are placed in an oven for 24 hours at a constant temperature of about 60° C. Print samples of the phase change ink of the present invention, subjected to the above described blocking test showed no blocking.

The above-defined DMA properties of the phase change ink compositions were experimentally determined. These dynamic measurements were done on the Rheometrics Solids Analyzer (RSA II) manufactured by Rheometrics, Inc. of Piscataway, N.J., using a dual cantilever beam geometry. The dimensions of the sample were about $2.0 \pm 1.0$ mm thick, about $6.5 \pm = 0.5$ mm wide, about $54.0 \pm 1.0$ mm long. A time/cure sweep was carried out under a desired force oscillation or testing frequency of about 1 Hz and an auto-strain range of about $1.0 \times 10^{-5}\%$ to about 1%. The temperature range examined was about $-60°$ to about 90° C. The preferred phase change ink compositions typically are (a) flexible at a temperature of about $-10°$ to about 80° C., (b) have a temperature range for the glassy region from about $-100°$ to 40° C., the value of E' being from about $1.5 \times 10^9$ to $1.5 \times 10^{11}$ dyne/cm$^2$, (c) have a temperature range for the transition region from about $-30°$ to about 60° C., (d) have a temperature range for the rubbery region of E' from about $-10°$ to 100° C., the value of E' being from about $1.0 \times 10^6$ to $1.0 \times 10^{11}$ dyne/cm$^2$, and (e) have a temperature range for the terminal region of E' from about 30° to about 160° C. Furthermore, the glass transition temperature range of the phase change ink compositions are from about $-40°$ to about 40° C., the temperature range for integrating under the tan $\delta$ peak of the phase change ink composition is from about $-80°$ to about 80° C. with integration values ranging from about 5 to about 40, and the temperature range for the peak value of tan $\delta$ of the phase change ink is from about −40° to about 40° C. with a tan δ of about $1.0 \times 10^{-2}$ to about $1.0 \times 10$ at peak.

A representative plot of the storage modulus, E', as a function of temperature at 1 Hz for an appropriate phase change ink composition for use in the printing process of the present invention can be produced. The curve will be divided up into four distinct regions: glassy, transition, rubbery, and terminal.

In the glassy region the ink behaves similar to a hard, brittle solid i.e., E' is high, about $1 \times 10^{10}$ dyne/cm². This is because in this region there is not enough thermal energy or long enough time for the molecules to move. This region needs to be well-below room temperature so the ink will not be brittle and affect the room temperature performance on paper.

The transition region is characterized by a large drop in the storage modulus of about one order of magnitude. This is because the molecules have enough thermal energy or time to undergo conformational changes. In this region, the ink changes from being hard and brittle to being tough and leathery.

The rubbery region describes a slightly decreasing plateau. In this region, there is a short term elastic response to the deformation that gives the ink its flexibility. It is theorized that the impedance to motion or flow in this region is due to entanglements of molecules or physical cross-links from crystalline domains. Fine tuning of the ink to get this plateau in the appropriate temperature range for good transfer and fixing and room temperature performance is of great importance in formulating these phase change ink compositions. The rubbery region encompasses the ink in both its malleable state during the transfer and fixing or fusing step and its final ductile state on the final receiving substrate.

Finally, in the terminal region, there is another drop in the modulus. It is believed in this region that the molecules have sufficient energy or time to flow and overcome the entanglements.

The general temperature profile of tan δ for a phase change ink composition for use in the printing process of the present invention can be described as follows. In the glassy region, tan δ is small. The peak of the damping curve occurs in the transition region and indicates the $T_g$ of the material. The area under the tan δ curve gives an indication of the relative toughness of the ink, which is a measure of the energy dissipated during deformation. Since tan δ is equal to the loss modulus divided by the storage modulus, it is not necessary to specify the profiles of both the tan δ and loss modulus.

The phase change ink compositions were also analyzed by compressive yield testing. The compressive yield strength measurements were done on an MTS SINTECH 2/D mechanical tester manufactured by MTS Sintech, Inc. of Cary, N.C., using small cylindrical sample blocks. The dimensions of a typical sample are about $19.0 \pm 1.0$ mm × about $19.0 \pm 1.0$ mm. Isothermal yield stress was measured as a function of temperature (about 25° to about 80° C.) and strain rate. The material was deformed up to about 40%.

The preferred yield stresses as a function of temperature for suitable phase change ink compositions for use in the indirect printing process of the present invention are described by an equation as follows:

$$YS = mT + I$$

wherein YS, which is a function of temperature, is the yield stress, m is the slope, T is the temperature, and I is the intercept.

Under non-process conditions, i.e., after the final printed product is formed or conditions under which the ink sticks are stored, and the ink is in a ductile state or condition at a temperature range of from at least about 10° to about 60° C., the preferred yield stress values are described by m as being from about $-9 \pm -2$ psi/° C. to about $-36 \pm -2$ psi/° C. and I as being from about $800 \pm 100$ psi to about $2200 \pm 100$ psi. More preferably, m is about $-30 \pm -2$ psi/° C. and I is about $1700 \pm 100$ psi. Under process conditions, i.e., during the indirect printing of the ink from an intermediate transfer surface onto a substrate while the ink is in a malleable solid condition or state, at a temperature of from at least about 30° C. to about 80° C., the preferred stress values are described by m as being from about $-6 \pm -2$ psi/° C. to about $-36 \pm -2$ psi/° C. and I as being from about $800 \pm 100$ psi to about $1600 \pm 100$ psi. More preferably, m is about $-9 \pm -2$ psi/° C. and I is about $950 \pm 100$ psi.

In operation the support surface or drum 14 has a layer of liquid intermediate transfer surface applied to its surface by the action of the applicator assembly 16. Assembly 16 is raised by an appropriate mechanism (not shown), such as an air cylinder, until the web 15 is in contact with the surface of the drum 14. The liquid is retained within a reservoir (not shown) within the assembly 16 and passes through the porous supporting material 18 until it saturates the web 15 to permit a uniform layer of desired thickness of the liquid to be deposited on the surface of the drum 14. The drum 14 rotates about a journalled shaft in the direction shown in FIG. 1 while the heater 19 heats the liquid layer and the surface of the drum 14 to the desired temperature. Once the entire periphery of the drum 14 has been coated, the applicator apparatus is lowered to a non-contact position with the liquid layer forming the intermediate transfer surface 12 on the exterior of the drum 14.

Ink is applied to the exposed surface of the liquid intermediate transfer surface 12 by the printhead 11. The ink is applied in molten form, having been melted from its solid state form by appropriate heating means (not shown). The ink image 26 solidifies on the surface of the liquid by cooling to a malleable solid intermediate state as the drum continues to rotate, entering the nip formed by the roller 22 and the curved surface of the intermediate transfer surface 12 supported by the drum 14. The ink image 26 is deformed to its final image conformation and adhered to the final receiving surface 28 by being pressed there against. The ink image 26 is thus transferred and fixed to the final receiving surface 28 by the pressure exerted on it in the nip by the resilient or elastomeric surface of the roller 22. Stripper fingers 25 help to remove the imaged final receiving surface 28 from the liquid intermediate transfer surface 12 as the drum rotates. The ink image 26 then cools to ambient temperature where it possesses sufficient strength and ductility to ensure its durability.

After a predetermined number of imagings, such as 10 or fewer as needed, the applicator assembly 16 is actuated to raise upward into contact with the sacrificial intermediate transfer surface 12 to replenish the liquid forming the surface 12.

The following examples are presented to illustrate the scope of the invention and to be illustrative of the type of materials that can be successfully employed as the liquid intermediate transfer surface 12, without any intent to limit the invention to the specific materials, process or structure employed.

EXAMPLE I

A test fixture having a rotatably mounted about 0.004 inch thick drafting Mylar ® plastic-covered aluminum drum with the matte side of the plastic facing out and a diameter of about 4.13 inches was positioned adjacent and in close proximity to a transfer and fusing roller of smaller diameter. A piezoelectrically driven printhead with phase change ink was positioned intermediate the drum and the transfer and fusing roller to deliver the primary colors of cyan, magenta, yellow and black to the exposed surface of a thin liquid layer of an intermediate transfer surface in raster fashion. The drum surface was hand coated with a liquid layer consisting of a mixture of about 79.5% by weight deionized water, about 20% by weight polyethylene glycol available as PEG 200 from Aldrich Chemical Company, and about 0.5% by weight of a fluorinated surfactant leveling agent commonly used in epoxies and available from the 3M Company under the tradename Fluorad FC-430 coating additive. This mixture was applied manually with a hand wipe available from Kimberly-Clark under the KAYDRY tradename to form the liquid intermediate transfer surface. The liquid layer was not entirely evenly applied to the drum surface since more thickly coated areas were noticeably visible. The drum temperature was maintained at about 29° C. to about 30° C. Paper was used as the final receiving substrate and was preheated by an external heating device with a temperature of about 100° C. prior to being brought into contact with the transferred ink image. The transfer and fusing roller was also heated by an external heating device having a setpoint of about 120° C.

During imaging the drum was rotated at a surface speed of about 33.3 inches per second. During transfer and fixing, the surface speed of the roller was about 5 inches per second. A full color test image was imaged by the printhead on the liquid intermediate transfer layer and transferred to Xerox 4024 plain copy paper. The transferred image was of good quality with only a few pixels left untransferred to the paper.

EXAMPLE II

The same test fixture and conditions as described above were employed, except that the liquid used to form the liquid intermediate transfer layer was an alkylphenyl polyglycol nonionic surfactant sold under the tradename Triton ® X-100 by Spectrum Chemical Manufacturing Corporation of Gardenia, Calif. Multiple copies of the same test image as in Example I were made, producing prints with somewhat tacky imaged areas. When the print sheets were stacked one on top of another, some parts of the color image were transferred to the back of the overlying-sheet of paper. It appeared as though the liquid used as the intermediate transfer layer penetrated the ink, partially plasticizing it. However, the inked image was successfully transferred from the liquid intermediate transfer surface to the paper.

EXAMPLE III

The same test fixture and conditions as were utilized in Example I were employed, except that the fluorinated surfactant leveling agent sold under the tradename Fluorad FC-430 by 3M Corporation was employed as the liquid intermediate transfer surface. Two prints were made of the same full color test image as in Example I, with incomplete areas of transfer and a slightly tacky feeling in the printed areas.

EXAMPLE IV

The same test fixture and conditions as were utilized in Example I were employed, except that the liquid was applied in a wicking fashion with a wick/felt laminate applicator having a steel backing plate. The applicator had a force measured in air pressure of about 19.5 pounds per square inch or about 15 pounds of force pressing it against the surface of the drum while applying the liquid layer. About 80 cubic centimeters of the liquid was placed into the applicator's reservoir. Five prints were made at the initial transfer and fixing speed of about 5 inches per second. The speed was increased by about 1 inch per second up to about 11 inches per second until a total of 51 full color test prints of the type in Example I were made, including 2 transparencies made at a fixing speed of about 11 inches per second. Successful transfers were made at each transfer speed, but abrasion testing disclosed a gradual decrease in adherence of the images to the paper at the higher transfer speeds. Acceptable quality color prints were made up to transfer speeds of about 7 inches per second.

EXAMPLE V

The same test fixture and conditions as were utilized in Example I were employed, except that the liquid was deionized water and was applied with a wick/felt laminate applicator in wicking fashion to a depth of about 1 mil. The applicator employed a steel backing plate. The liquid was intended to be delivered in a wicking fashion. The applicator delivered the liquid with about 18 pounds of force, forcing it against the surface of the drum while applying the liquid layer. About 80 cubic centimeters of the liquid was placed into the applicator's reservoir. Several prints were made of a four color bar pattern at an initial transfer and fixing speed of about 5 inches per second. The imaging surface speed was about 23.3 inches per second with an application time at the imaging speed of about 800 microseconds. The ink drop ejection rate was set at about 7 Khz. The heater for the final receiving substrate, which in this case was paper, was set at about 100° C. The transfer and fixing roller's heater had a set point of about 120° C. The surface of the drum supporting the liquid layer was heated to between about 30° C. to about 31° C., which caused some accelerated evaporation of the deionized water forming the liquid layer and required a relatively fast transfer speed. Successful four color transfers were made with each attempt, although it appeared that too hick of a layer of the deionized water would result in displaced dots.

EXAMPLE VI

A test fixture similar to that employed in Example I was used, except that the support drum was aluminum with an anodized surface finish. The drum had a diameter of about 3.979 inches and was externally heated across an air gap with a resistance heater that was linked to a control with an established setpoint of about 47° C.

The heated drum surface was coated with silicone oil sold under the tradename Dow Corning 200. The oil was applied by being contacted for less than about 0.6 seconds during two rotations of the drum at an application speed of about 40 inches per second with an oil impregnated polyester web contained within a raisable cassette assembly. The web was pressed into contact with the drum surface with a force of about 10 pounds. Once the drum surface was fully coated with the liquid layer that forms the intermediate transfer surface, the cassette assembly was lowered out of contact with the drum.

The paper final receiving substrate was preheated by a flat and flexible vulcanized silicone heater attached to the paper feed guides and having. a temperature setpoint of about 120° C. The transfer and fusing roller had a diameter of about 1.5 inches and a length of about 9 inches. The roller was not heated, but was stabilized at a temperature of about 45° C. The roller applied a nip pressure of about 750 to about 850 pounds per square inch. The roller was coated with about a 0.09 inch thick Shore D 40 elastomer.

A full test image was created on the liquid layer of silicone oil forming the intermediate transfer surface under the same conditions as were utilized for imaging in Example I and was transferred to Xerox 4024 plain copy paper. The transferred image was of excellent quality with no untransferred pixels left behind on the liquid layer.

While the invention has been described above with reference to specific embodiments thereof, it is apparent that many changes, modifications and variations in the materials, arrangements of parts and steps can be made without departing from the inventive concept disclosed herein. For example, the liquid layer also could be applied to the supporting surface from an internal, in the instance of a drum, or underlying resupply source or reservoir so that it passes to the surface by seeping or penetrating through the porous surface. The porous surface could be sponge-like, such as an appropriate sintered metal. The liquid could also pass to the surface by diffusion, such as its first being absorbed into microscopic pores within the surface of the support surface and then diffusing out. Accordingly, the spirit and broad scope of the appended claims is intended to embrace all such changes, modifications and variations that may occur to one of skill in the art upon a reading of the disclosure. All patent applications, patents and other publications cited herein are incorporated by reference in their entirety.

Having thus described the invention, what is claimed is:

1. A method of imaging in printer using phase change ink comprising the steps of
   (a) applying a liquid to a first supporting surface to form a liquid layer, the liquid layer serving as an intermediate transfer surface and having an exposed surface not in contact with the supporting surface and an opposing second surface in contact with the supporting surface,
   (b) imaging the exposed surface of the liquid layer by applying a phase change ink to form an image thereon by changing the ink from a solid state to a molten state and applying it at a temperature of about 85° C. to about 150° C. in the molten state to the liquid layer where the ink solidifies into a malleable state having a temperature of between about 30° C. and about 80° C.; and
   (c) transferring the image of malleable ink to a receiving medium where the ink further solidifies to a ductile state so that it will yield without fracturing and is flexible between about −10° C. and about 80° C.

2. The method according to claim 1 further comprising repeating steps (b) and (c) a predetermined number of times.

3. The method according to claim 1 further comprising applying the liquid layer to the supporting surface so as to have a thickness of from about 0.05 to about 60 microns.

4. The method according to claim 3 further comprising reapplying liquid to the liquid layer serving as the intermediate transfer surface on the supporting surface to renew the liquid layer.

5. The method according to claim 4 further comprising using as the liquid layer one selected from the group consisting of water, a fluorinated oil, glycol, mineral oil, silicone oil, a surfactant, a functional oil, or combinations thereof.

6. The method according to claim 5 further comprising applying the ink to the liquid layer forming the intermediate transfer surface from an ink jet printhead.

7. The method according to claim 6 further comprising using an ink having a composition comprising a fatty amide-containing material and a compatible colorant.

8. The method according to claim 7 further comprising using the fatty amide-containing material as a phase change ink carrier composition comprising a tetraamide compound and a monoamide compound such that the phase change ink carrier composition is in a solid phase at ambient temperature and in a liquid phase at elevated operating temperature.

9. The method according to claim 8 further comprising the phase change ink carrier composition comprising from about 10 to about 50 weight percent of a tetraamide compound, from about 30 to about 80 weight percent of a secondary mono-amide compound, from about 0 to about 40 weight percent of a tackifier, from about 0 to about 25 weight percent of a plasticizer, and from about 0 to about 10 weight percent of a viscosity modifying agent.

10. The method according to claim 5 further comprising the ink used in the imaging step being deformed by pressure while in the malleable solid condition during the transfer to the receiving medium.

11. The method according to claim 10 further comprising the ink used in the imaging step in the malleable solid condition during the transfer to the receiving medium having a yield stress value (YS), according to the equation $YS = mT + I$, as defined by m being from about $-6 \pm -2$ to about $-19 \pm -2$ psi/°C.; T is from about 30° to about 80° C.; and I is from about $780 \pm 100$ psi to about $1600 \pm 100$ psi.

12. The method according to claim 10 further comprising the ink used in the imaging step being on the receiving medium in a fracture resistant ductile condition having a yield stress value (YS), according to the equation $$YS = mT + I$$

as defined by m being from about $-9 \pm -2$ to about $-36 \pm -2$ psi/°C.; T is from about 10° to about 60° C.; and I is from about $800 \pm 100$ psi to about $2200 \pm 100$ psi.

13. Apparatus for use in a system for imaging with a phase change ink comprising in combination:
   a. a first supporting surface;
   b. apparatus for applying a liquid to the first supporting surface to thereby create a liquid layer that is an intermediate transfer surface thereeon, the liquid layer having a first surface in contact with the first supporting surface and an exposed second surface not in contact with the supporting surface;

c. apparatus for imaging the exposed surface of the liquid layer with a phase change ink to form an image thereon by changing the ink from a solid state to a molten state and applying it at a temperature of about 85° C. to about 150° C. in the molten state to the liquid layer where the ink solidifies into a malleable intermediate state having a temperature of between about 30° C. and about 80° C.;

d. apparatus for transferring the image of a malleable ink to a final receiving medium where the ink further solidifies to a ductile state so that it will yield without fracturing and is flexible between about −10° C. to about 80° C.

14. The apparatus according to claim 13 wherein the first supporting surface is a rotatable drum mounted to the imaging apparatus.

15. The apparatus according to claim 14 wherein the apparatus for applying a liquid layer to the first supporting surface further comprises a web that is raisable into and out of contact with the first supporting surface.

16. The apparatus according to claim 15 wherein the apparatus for imaging the exposed surface further comprises an ink jet print head which selectively ejects ink.

17. The apparatus according to claim 16 whereby the apparatus for transferring the ink image to the final receiving medium further comprises a roller to pressure fuse the ink image to the final receiving medium by deforming the ink image and adhering the ink image thereto.

18. The apparatus according to claim 16 further comprising apparatus to cool the transferred and deformed ink image to a ductile and fracture resistant condition at ambient air temperature.

19. A method of imaging comprising the steps of
(a) imaging a first liquid layer surface with a phase change ink by applying heat to change the phase change ink from a solid state to a liquid state having a temperature of between about 85° C. to about 150° C. and applying the ink in the liquid state to the liquid layer surface;
(b) cooling the phase change ink while in the liquid state to a malleable condition such that the ink has a temperature of between about 30° C. and about 80° C.;
(c) transferring the phase change ink in the malleable condition to a final receiving medium; and
(d) cooling the phase change ink on the final receiving medium to a ductile condition in the solid state so that the phase change ink will yield without fracturing and is flexible between about −10° C. and about 80° C.

20. The method according to claim 19 further comprising deforming the phase change ink during the transferring step.

21. The method according to claim 20 further comprising the deforming step changing the phase change ink to a final image conformation.

22. The method according to claim 20 further comprising fusing the phase change ink to the final receiving medium during the deforming step.

23. The method according to claim 19 further comprising deforming the ink before the transferring step.

24. The method according to claim 23 further comprising the deforming step changing the phase change ink to a final image conformation.

25. The method according to claim 23 further comprising fusing the phase change ink to the final receiving medium during the deforming step.

26. The method according to claim 19 further comprising the ink having a yield stress in the malleable condition between about 30° C. and about 80° C. of between about 460 to about 1190 psi and of between about 60 to about 340 pounds per square inch calculated according to the equation $YS = mT + I$, as defined by m being from about $-6 \pm -2$ psi/°C. to about $-19 \pm -2$ psi/°C.; T is from about 30° to about 80° C.; and I is from about $800 \pm 100$ psi to about $1600 \pm 100$ psi.

27. The method according to claim 19 further comprising the ink having a yield stress in the ductile condition between about 10° C. and about 60° C. of between about 590 to about 1960 psi and of between about 40 to about 260 psi calculated according to the equation $YS = mT + I$, as defined by m being from about $-9 \pm -2$ to about $-36 \pm -2$ psi/°C.; T is from about 10° to about 60° C.; and I is from about $800 \pm 100$ psi to about $2200 \pm 100$ psi.

28. A method of imaging in a printer using phase change ink comprising the steps of
(a) applying liquid layer to a first supporting surface, the liquid layer serving as an intermediate transfer surface and having an exposed surface not in contact with the supporting surface and an opposing second surface in contact with the supporting surface,
(b) imaging the exposed surface of the liquid layer by applying a phase change ink to form an image thereon by changing the ink from a solid state to a molten state and applying it at a temperature of about 85° C. to about 150° C. in the molten state to the liquid layer;
(c) heating a receiving medium prior to transferring the ink image thereto; and
(d) transferring the ink image to the receiving medium where the ink solidifies to a ductile solid state in which the ink will yield without fracturing and is flexible between about −10° C. and about 80° C.

29. The method according to claim 28 further comprising the ink solidifying into a malleable intermediate state prior to transfer to the receiving medium having a temperature of between about 30° C. and about 80° C.

30. The method according to claim 28 further comprising the ink solidifying into a ductile state after transfer to the receiving medium having a temperature of between about 10° C. and about 60° C.

31. The method according to claim 28 further comprising the receiving medium being heated to a temperature of between about 90° C. and about 100° C. prior to the transfer of the ink image.

* * * * *